April 18, 1933.  R. A. NORLING  1,904,322
STUD SETTING TOOL
Filed March 26, 1932   3 Sheets-Sheet 2
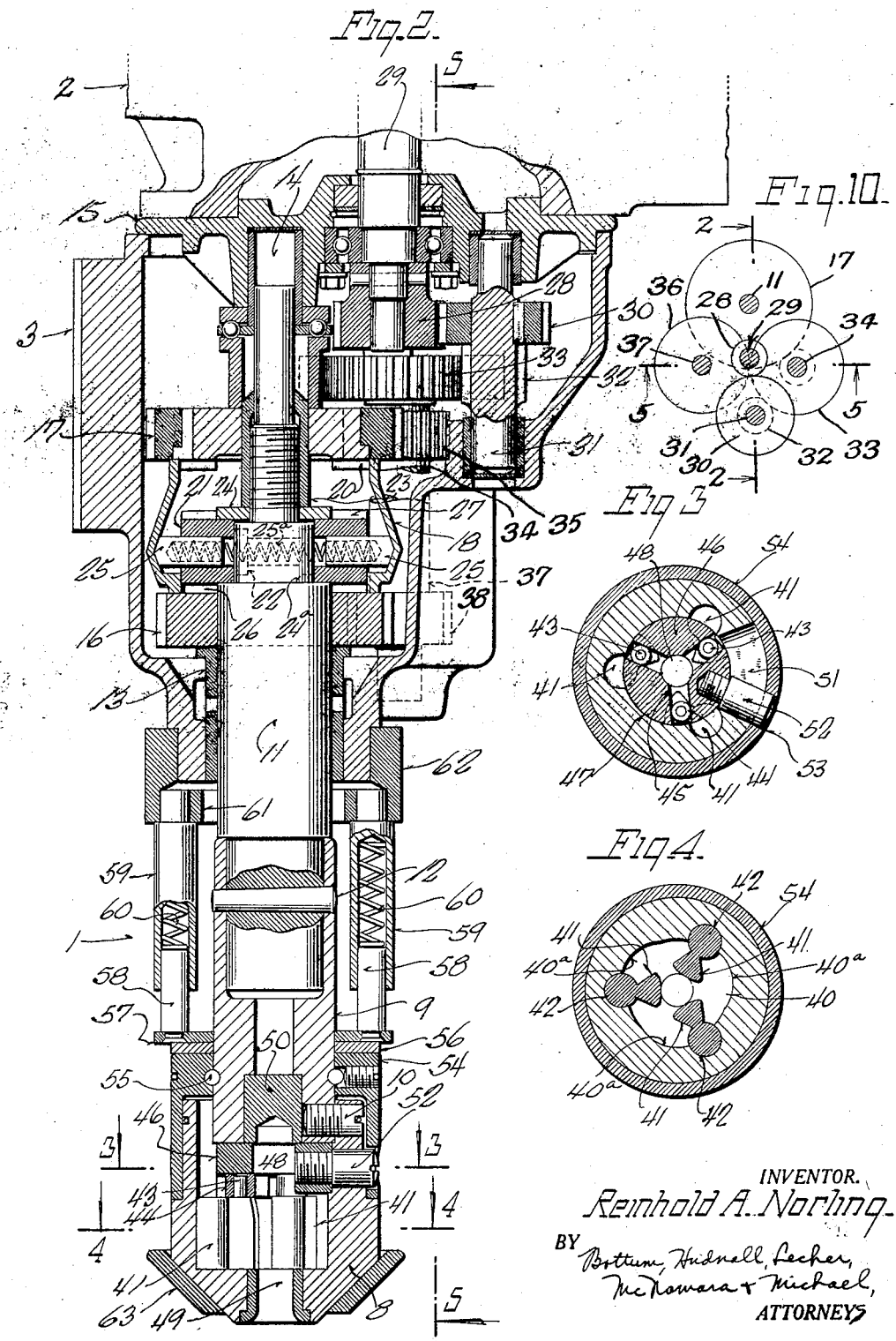
INVENTOR.
Reinhold A. Norling
BY
ATTORNEYS April 18, 1933.  R. A. NORLING  1,904,322
STUD SETTING TOOL
Filed March 26, 1932   3 Sheets-Sheet 3
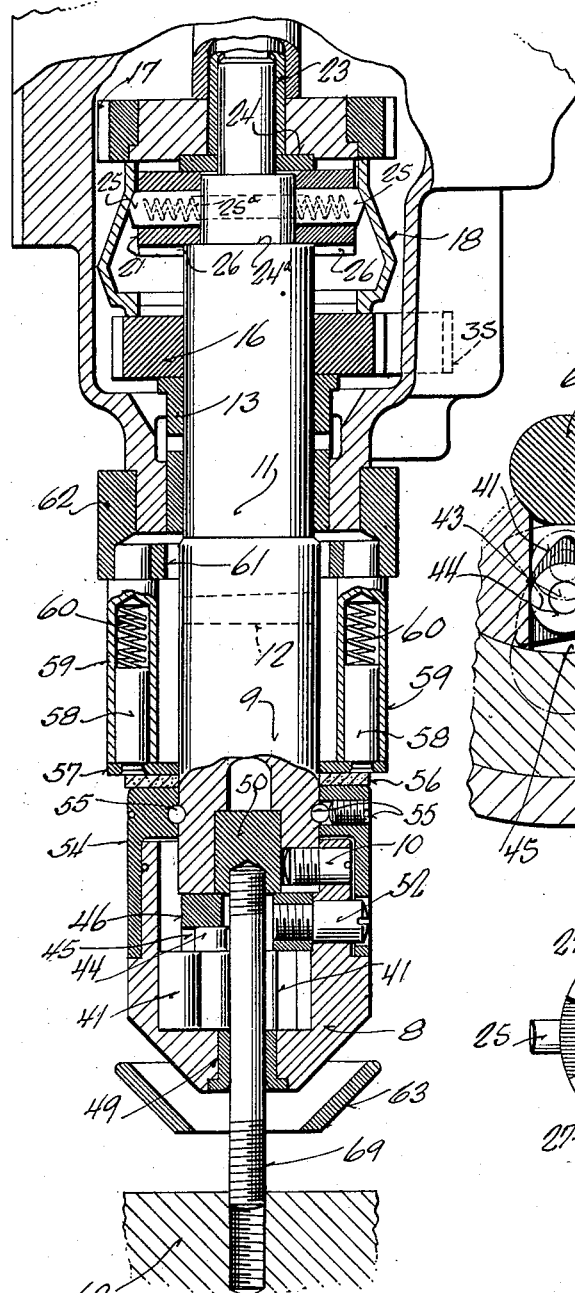
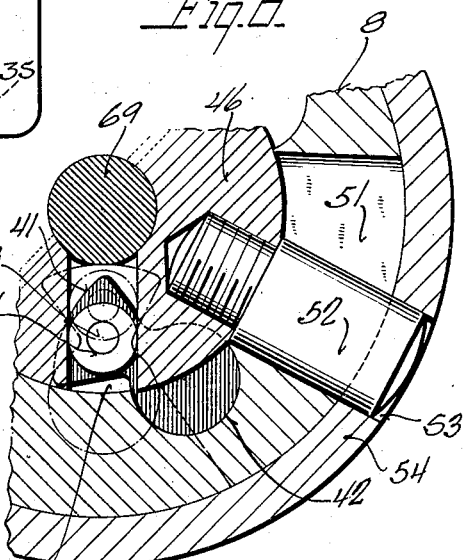
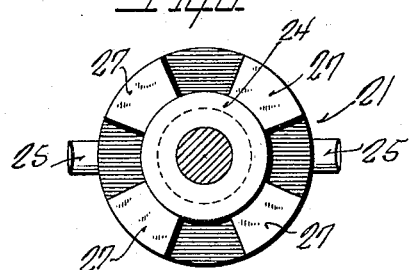
INVENTOR.
Reinhold A. Norling
BY Bottum, Hudnall, Lecher,
McNamara & Michael,
ATTORNEYS Patented Apr. 18, 1933

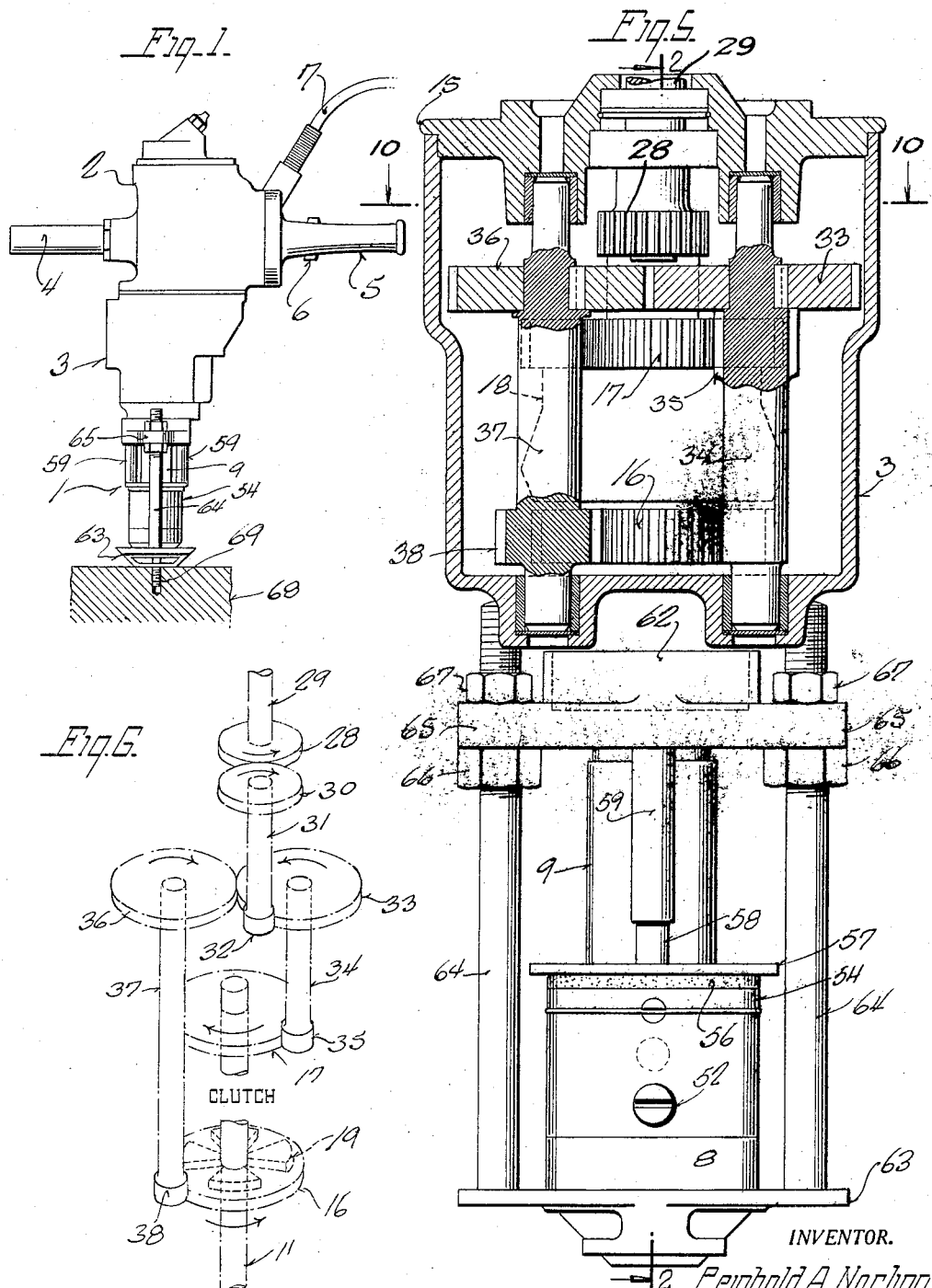

1,904,322

UNITED STATES PATENT OFFICE

REINHOLD A. NORLING, OF AURORA, ILLINOIS, ASSIGNOR TO INDEPENDENT PNEUMATIC TOOL CO., OF CHICAGO, ILLINOIS, A CORPORATION OF DELAWARE

STUD SETTING TOOL

Application filed March 26, 1932. Serial No. 601,442.

This invention relates to portable power driven rotary tools and more particularly to a stud setting mechanism for such tools.

One object of my invention is to provide a stud setting mechanism which is simple in construction, inexpensive to manufacture, and efficient in operation.

Another object of my invention is to provide a stud setting mechanism, the action of which in gripping and releasing a stud is automatic, being controlled by the power furnished by the tool.

Another object of my invention is to provide a stud setting mechanism which on the application of the tool to the stud to drive the same will grip the stud and release the stud from the driving power of the tool as soon as the stud becomes set to the extent desired in the member or part to receive it.

A further object of my invention is to provide the stud setting mechanism with jaws, the action of which in gripping and releasing a stud is controlled through the relative rotation of parts or members in the mechanism.

A further object of my invention is to control the relative rotation of these parts through a brake device which tends to retard the rotation of one part to permit the rotation of the other to actuate the jaws.

A further object of my invention is to utilize the action of the spindle of the tool in changing its direction of rotation to control the operation of the jaws in gripping and releasing a stud.

A further object of my invention is to provide a clutch device and cooperating forward and reverse gears for the spindle to change the direction of rotation of the spindle to actuate the jaws.

A further object of my invention is to utilize endwise movement permitted of the spindle to actuate the clutch for alternately connecting the spindle with the forward and reverse gears.

A further object of my invention is to provide an adjustable stop device for regulating the depth to which studs may be driven by the tool.

The invention consists further in the matters hereinafter described and claimed.

Fig. 1 shows a portable power driven rotary tool equipped with a stud driving mechanism of my invention;

Fig. 2 is an enlarged vertical sectional view with parts in elevation, taken on line 2—2 of Figs. 5 and 10, to show the details of the stud driving mechanism, the drive for the reversing gear being shown in dotted lines as being in front of the plane on which the section is taken.

Figs. 3 and 4 are horizontal sectional views taken on lines 3—3 and 4—4, respectively, of Fig. 2;

Fig. 5 is a vertical sectional view, taken on line 5—5 of Figs. 2 and 10;

Fig. 6 is a diagrammatic view illustrating the gear drive;

Fig. 7 is a view similar to Fig. 2 showing the tool engaged with a stud for driving the same;

Fig. 8 is a view showing the action of a chuck jaw;

Fig. 9 is a plane view of the shiftable member of the clutch device; and

Fig. 10 is a top plane view of the gearing assembly taken on line 10—10 of Fig. 5.

As shown in the drawings, the stud setting mechanism 1 of my invention is applied to an electrically operated portable tool having a motor section 2 and a gear case section 3. The stud setting mechanism 1 is applied to the gear case section of the tool and extends outwardly therefrom in the general direction of the longitudinal axis of the tool. The motor section 2 is provided on opposite sides with handles 4, 5 to permit grasping and handling the tool. The handle 5 is provided with a switch mechanism for turning on and off the current to the motor in the section 2, said switch mechanism having an operable push member 6 as shown in Fig. 1. The current for the motor is supplied thereto through conductors in a cable 7 attached to the motor section 2 as in tools of this general character.

The stud setting mechanism is shown in detail in Figs. 2 and 7. The mechanism comprises a chuck having a body 8 at the forward or outer end of the mechanism. Body 8 is secured to a shank 9 by a screw 10. Shank 9 is secured to the spindle 11 of the tool by a pin 12. Spindle 11 extends out of the gear case section 3 and is rotatably and slidably mounted therein in a sleeve or bushing 13 fitted in the outer end of the section. The inner end of the spindle is supported and guided by a boss 14 on the gear case cover 15. Boss 14 is made hollow to receive the inner end of the spindle, which end is reduced to enter and slide in the boss, as shown.

Mounted on the spindle 11 within gear case section 3 are two gears 16, 17. These gears are arranged one above the other, as shown in Figs. 2 and 7, and are maintained in spaced relation by an interposed annular housing 18. Gears 16, 17 are rotative with respect to the spindle 11 and constitute the reverse and forward driving gears, respectively, for the spindle. Gears 16, 17 are provided with clutch teeth 19 and 20. Teeth 19 on the reverse gear 16 are on the upper side of the gear, while teeth 20 on the forward gear 17 are on the underside of the gear, as shown in Figs. 6 and 2, respectively. These teeth are within the housing 18 and cooperate with similar teeth on a shiftable clutch member 21.

Clutch member 21 in the form of a collar fixed to the spindle 11 between the gears 16, 17 by key 22 is held in place on the spindle by a nut and washer 23, 24. The latter are on the upper side of the clutch member and clamp it against a shoulder 24a on the spindle, as shown. Nut 23 is in the form of a sleeve screwed on the threaded portion of the spindle above the collar 21, said sleeve extending through the reverse gear 17 and providing a bearing therefor. Clutch member 21 carries a pair of diametrically disposed spring pressed plungers 25 arranged in recesses in the collar, as shown in Fig. 2. These plungers are projected outward beyond the periphery of the collar and against the inner surface of the housing member 18 by a coiled spring 25a between them. The portion of the spindle surrounded by the collar 21 has an opening therethrough to accommodate the spring, as shown. The member 18 is inclined upwardly and inwardly from its lower end to provide a cam surface, the purpose of which will be presently described. The outer ends of the plungers are inclined to conform to this cam surface. The clutch member 21 is provided on its opposite sides with clutch teeth 26, 27, the former to engage the teeth 19 on the reverse gear 16 and the latter to engage the teeth 20 on the forward gear 17 in the action of the clutch device.

For driving the gears 16, 17 simultaneously and in reverse directions, a gear train as illustrated diagrammatically in Fig. 6, is arranged in the gear case section 3. This train includes a gear 28 fixed to the lower end of the armature shaft 29 of the motor of the tool. Gear 28 meshes with a pinion 30 fixed to a shaft 31, the latter having gear teeth 32 which mesh with the teeth of a gear 33 on a shaft 34. Shaft 34 has a pinion 35 meshing with the reverse gear 17. Gear 33 meshes with a gear 36 on a shaft 37. The latter has a pinion 38 which meshes with the reverse gear 16. With the motor gear 28 rotated in the direction of the arrow in Fig. 6, the other gears will be rotated as indicated and the gears 16 and 17 will be driven in forward and reverse, respectively, and at the same time. With the gears 16, 17 loose on the spindle 11, the latter may be rotated in either direction by connecting it with either of said gears through the clutch member 21.

Chuck body 8 is provided with an internal recess 40 arranged about the axis of the body and into which recess extend a number of stud gripping jaws 41, 41, as shown in Fig. 4. These jaws are disposed in parallel relation to each other and to the axis of the body and are rockably or swingably mounted therein in longitudinal grooves 42, 42, arranged in the body and opening into the recess 40 as shown. These grooves are arcuate in cross-section and the portions of the jaws fitting in the grooves are similarly shaped so as to provide a rocking or swinging mounting for the jaws. The latter are provided at their upper ends with pins 43 on which are rollers 44, one for each jaw. The pins 43 are offset inward from the axes about which the jaws are swung in the body and extend into radial grooves or slots 45 in the underside of a collar 46 arranged concentric to the axis of the chuck body and located therein within a circular recess 47 above the jaws, as shown in Fig. 3. The collar 46 is provided with an axial bore 48 to permit a stud to be driven to pass therethrough in the application of the tool to a stud. This bore 48 is in alinement with a bushing lined opening 49 in the lower end of the chuck body 8 to receive the stud, as shown in Fig. 2. Shank 9 provides an upper bearing for the collar 46 and is there provided with a block 50 forming an abutment for the upper end of the stud when the tool is applied over the same.

To shift the jaws 41 into and out of stud engaging positions, collar 46 and chuck body 8 are relatively rotatable about their coinciding axes. The chuck body is provided at one side with a transverse slot 51 through which extends a screw pin 52. The latter is screwed at its inner end into the collar 46 and has its outer end fitting in an opening 53 in a sleeve 54 extending over the outer side of the chuck body from the shank 9. The sleeve 54 is rotatably mounted on the shank through bearing balls 55 fitting in annular grooves in the shank and sleeve as shown. To retard the rotation of the sleeve 54 with the spindle, a disc 56 of friction material is interposed between the upper end of the sleeve and a plate 57, the latter being normally pressed against the disc 56 by spring pressed plungers 58 carried by the stationary gear case section of the tool. The plungers are supported in tubes 59 which also provide housings for springs 60 which force the plate 57 against the friction disc 56, as shown in Fig. 2. The upper ends of the tubes are fitted in a flange 61 on a collar 62 applied about the lower end of the gear case section 3.

The device for limiting the depth to which a stud may be driven by the tool, comprises a base member 63 shaped on its underside to surround the lower end of the chuck 8 and to normally lie in a plane slightly above the lower end of the chuck, as shown in Figs. 2 and 5. Member 63 is connected by rods 64 to outwardly projecting webs or flanges 65 on collar 62, as shown in Fig. 5. The rods are secured to the collar 62 by nuts 66, 67, the latter permitting endwise adjustment of the rods to regulate the depth to which a stud may be driven by the tool.

The mechanism shown and described operates as follows: Springs 60 serve to normally force the spindle 11 outward from the tool and maintain the lower teeth of the clutch member 21 in driving engagement with the teeth 19 on the upper side of the reverse gear 16. This is the normal position of the parts of the tool (Fig. 2) when removed from the work and when the tool is set in operation the spindle 11 by the gear 16, is rotated in a reverse direction, that is, toward the left. The pin 52 is at one end of the slot 51 and the jaws 41 are in stud receiving positions, as shown in Fig. 3. The springs 60 also hold the chuck body against the stop member 63 and the tool is thus in condition to be applied to a stud for driving it into the work.

After the stud has been started in the thread hole to receive it in the work 68 (Fig. 1), the tool is then applied over the stud 69, the latter entering the opening 49 in the chuck body and passing through the bore 48 of the collar 46 until the upper end of the stud contacts with the block 50. A continued downward movement of the tool by the operator forcing the same against the stud causes the spindle 11 together with the chuck body to be moved inward, compressing the springs 60. As the spindle is moved inward, the clutch member 21 is moved out of driving engagement with the reverse 16 and is moved into driving engagement with the forward gear 17 as shown in Fig. 7. As soon as this gear is engaged, the spindle is then rotated in a forward direction, that is, toward the right, and the jaws 41 of the chuck are automatically swung into positions to grip the portion of the stud between them. This is due to the relative rotation permitted between the chuck 8 and the collar 46 as soon as the spindle is rotated by the forward gear. With the rotation of the sleeve 54 retarded by the brake device 56, 57, the rotation of the collar 46 is also retarded, and the chuck may therefore turn with respect to the collar. As the chuck turns to the right as shown in Fig. 8, the jaws are swung about the stationary collar on their pins 43 and are brought into the radial positions shown in Figs. 4 and 7. As soon as the jaws reach this position, the pin 52 is at the opposite end of the slot 51 and the chuck and its parts rotate as a unit with the spindle to drive the stud into the work.

Pressing the tool against the stud to engage the jaws therewith, lifts the chuck above the stop plate 63. The latter is thus in position to contact with the work in advance of the chuck. This occurs when the stud has been driven into the work to the depth desired. When the stop 63 engages the work, the pressure of the operator on the spindle is transferred to the outer case of the tool, and the springs 60 act to move the spindle outward. In this movement, the clutch member 21 is released from the forward driving gear 17 and as the plungers 25 engage against the outwardly inclined portion of the housing 18, a quick snap outward movement is imparted to the spindle as the plungers slide down the inclined portion of the housing, with the result that the clutch member 21 is quickly engaged with the teeth of the reverse gear 16 and the direction of the rotation of the spindle immediately changed to effect release of the jaws 41 from the stud, whereupon the tool is removed from the stud and its parts are again in position to engage another stud for driving the same.

The movement of the jaws into release positions is due to the chuck being turn to the left with respect to the collar 46 to the limit as afforded by the slot 51. The brake device retards the rotation of the sleeve 54 and collar 46, the same as before. When the end of the slot is reached, the parts rotate as a unit with the jaws in release position. The wall of the recess 40 is so shaped as to provide cavities or pockets 40a to receive the jaws and thus insure their movement far enough to free the bore 48 of the collar for the passage of a stud without hindrance by the jaws.

It will be observed that the mechanism shown and described is automatic in its action in conditioning the tool for driving a stud and for releasing the stud from the drive of the tool as soon as the stud becomes set to the extent desired. The advantage of this is manifest. The operator need not concern himself with actuating any parts of the settling mechanism to condition it to engage a stud or to release it. The action is automatically taken care of through the power supplied by the tool, and through the endwise movement of the spindle. Moreover, the rotation of the tool is not stopped between each stud setting operation, nor the direction of rotation of the motor changed. Consequently, with the tool continuously in operation, the momentum of the motor is available as soon as the tool is applied to a stud, thus permitting the rapid setting of studs by power. The action of the clutch device being controlled by the endwise movement given to the spindle and being quick acting on release of the jaws, no opportunity is afforded to strip the teeth of the stud by any undue setting operation. The stop mechanism also guards against this and also permits adjusting the tool to set studs to such depths as may be desired. As shown in Fig. 7, the portion of the stud engaged by the jaws are devoid of screw threads, the latter being located at the opposite ends of the stud. With the action of the chuck jaws controlled through the endwise movement of the spindle in opposite directions, the tool could be used without the stop device. The jaws would be released from the stud on withdrawing the tool therefrom. It is preferable to use the stop because it relieves the operator of determining when the stud has become set.

The details of construction and arrangement of parts shown and described may be variously changed and modified without departing from the spirit and scope of my invention.

I claim as my invention:

1. In a rotary tool, a slidably mounted spindle, a chuck carried thereby, forward and reverse driving gears rotatably mounted on the spindle and having clutch teeth, a clutch member with clutch teeth fixed to the spindle between the gears and movable by the spindle into and out of clutched engagement with said gears for alternately connecting the spindle thereto, a camming member between the gears and acting through the clutch member for imparting movement to the spindle when carrying the clutch member from the forward gear to the reverse gear, and means for rotating said gears in opposite directions.

2. In a rotary tool, a slidably mounted spindle, a chuck carried thereby, forward and reverse driving gears rotatably mounted on the spindle and having clutch teeth, a clutch member with clutch teeth fixed to the spindle between the gears and movable by the spindle into and out of clutched engagement with said gears, an annular member between the gears and having an inclined surface surrounding the clutch member, spring pressed plungers carried by the clutch member and engaging said surface to impart movement to the spindle when carrying the clutch member from the forward gear to the reverse gear, and means for rotating the gears in opposite directions.

3. In a tool for setting studs by power, a chuck, jaws swingably mounted therein, means for actuating the jaws to move them into and out of stud engaging positions, and a brake device operable on said means to retard the rotation of the same with the chuck to effect actuation of the jaws.

4. In a tool for setting studs by power, a chuck, jaws swingably mounted therein, a collar rotatably carried by the chuck and having means engaging the jaws to swing the same into and out of stud engaging positions, and a brake device for retarding the rotation of the collar with the chuck to effect actuation of the jaws.

5. In a tool for setting studs by power, a chuck, jaws swingably mounted therein, a collar rotatably carried by the chuck and having radial slots engaging pins on the jaws to swing the same into and out of stud engaging positions, and a brake device for retarding rotation of the collar with the chuck to effect actuation of the jaws.

6. In a tool for setting studs by power, a chuck, jaws swingably mounted therein, a collar and a sleeve rotatably mounted on said chuck, a pin connecting the collar to the sleeve through a slot in the chuck, means connecting the jaws with the collar in a manner to swing the jaws in the relative rotation of the chuck with repect to the collar, and a brake device acting on the sleeve to retard the rotation of the sleeve and collar with the chuck.

7. In a stud driving chuck, jaws swingably mounted therein and having offset pins thereon, a collar rotatably carried by the chuck and having radial slots engaging said pins, and a brake device for retarding the rotation of the collar with the chuck to effect swinging of the jaws into and out of stud engaging positions on reversing the rotation of the chuck by permitting the jaws to pivot about the pins as the chuck moves with respect to the collar.

8. In a tool for setting studs by power, a chuck, jaws carried thereby, means operable through the power furnished by the tool for moving the jaws into and out of stud engaging positions, and a brake device operable on said means to retard the rotation of the same with the chuck to effect actuation of the jaws, said brake device including a disc of friction material supported by the chuck and spring pressed plungers carried by the tool for applying pressure against the disc.

In witness whereof, I hereto affix my signature.

REINHOLD A. NORLING.